United States Patent
Moliton et al.

(10) Patent No.: US 8,116,001 B2
(45) Date of Patent: Feb. 14, 2012

(54) OPTICAL PIPE INTENDED FOR PRODUCING AN ELECTRONIC DISPLAY ARRANGEMENT

(75) Inventors: Renaud Moliton, Charenton-le-Pont (FR); Cécile Bonafos, legal representative, Paris (FR); Cédric Buchon, Charenton-le-Pont (FR)

(73) Assignee: Essilor International (Compagnie Generale d'Optique), Charenton-Le-Pont (FR)

( * ) Notice: Subject to any disclaimer, the term of this patent is extended or adjusted under 35 U.S.C. 154(b) by 490 days.

(21) Appl. No.: 12/308,507

(22) PCT Filed: Jun. 14, 2007

(86) PCT No.: PCT/FR2007/051435
§ 371 (c)(1),
(2), (4) Date: Dec. 15, 2008

(87) PCT Pub. No.: WO2007/148002
PCT Pub. Date: Dec. 27, 2007

(65) Prior Publication Data
US 2010/0284083 A1    Nov. 11, 2010

(30) Foreign Application Priority Data
Jun. 21, 2006   (FR) ...................................... 06 52567

(51) Int. Cl.
*G02B 5/18* (2006.01)

(52) U.S. Cl. ......................................................... 359/569
(58) Field of Classification Search .................... 359/13, 359/14, 569
See application file for complete search history.

(56) References Cited

U.S. PATENT DOCUMENTS

| | | | |
|---|---|---|---|
| 5,260,828 A | 11/1993 | Londono et al. | 359/565 |
| 5,969,864 A | 10/1999 | Chen et al. | 359/569 |
| 2002/0196428 A1 | 12/2002 | Yamagata et al. | 356/124 |
| 2005/0046954 A1* | 3/2005 | Achtner | 359/630 |
| 2007/0297056 A1 | 12/2007 | Moliton | 359/558 |

OTHER PUBLICATIONS

International Search Report dated Nov. 14, 2007.
XP002376157—Opt.Eng/vol. 40/Issue 5/ Diffractive Optics—Determination of phase-step errors of kinoform gratings from their diffraction efficiencies.

* cited by examiner

*Primary Examiner* — Alessandro Amari
(74) *Attorney, Agent, or Firm* — Sofer & Haroun, LLP

(57) ABSTRACT

A light pipe is provided for transmitting light signals from one of its ends to its other end facing toward the eye of a user for viewing a virtual image. The light pipe includes a diffractive component formed directly in the inlet surface. The diffractive component is an element satisfying the equation of an aspherical component of revolution of the "kinoform" type, where the diffractive component of the pipe has power situated in a range D (Thresh, X) defined by $D(Thresh, X) = D_{OPTDIF}(Thresh) \cap D_{XT}(X)$.

8 Claims, 5 Drawing Sheets

OPTICAL PIPE INTENDED FOR PRODUCING AN ELECTRONIC DISPLAY ARRANGEMENT

RELATED APPLICATIONS

This application is a National Phase application of PCT/FR2007/051435, filed on Jun. 14, 2007, which in turn claims the benefit of priority from French Patent Application No. 06 52567, filed on Jun. 21, 2006, the entirety of which is incorporated herein by reference.

FIELD OF THE INVENTION

The invention relates to a light pipe for making an electronic display arrangement.

BACKGROUND

Patent document FR 2 868 551 describes a light pipe for making an electronic display arrangement that is fitted to a frame of the spectacles type.

Figure 1:
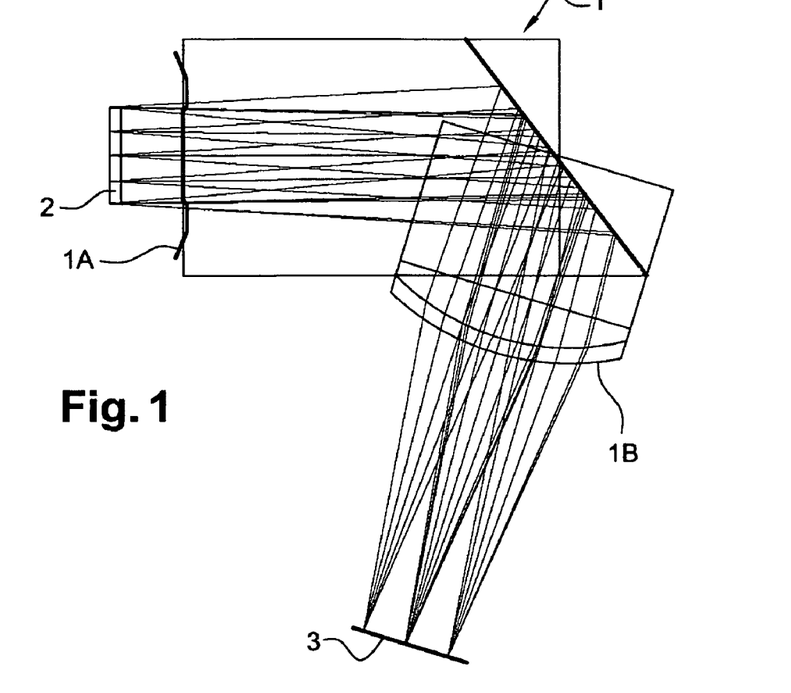
FIG. 1 is a plan view of a light pipe for use in making an electronic display arrangement.
Figure 2:
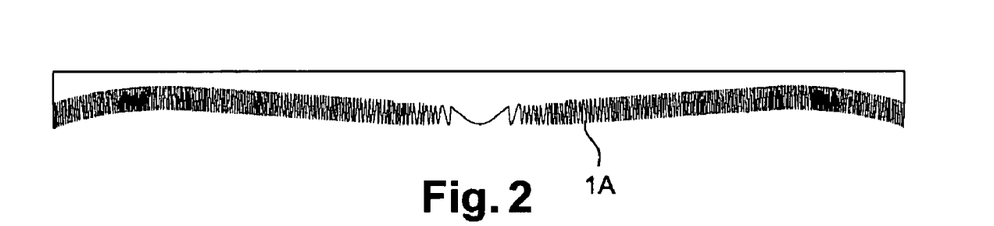
FIG. 2 is a radial section view of a diffractive element carried by the inlet surface of the pipe.

Such a pipe 1, as shown in FIG. 1, serves to transmit light signals emitted by a miniature screen 2 from one of its ends, referred to as its inlet surface 1A, to its other end, referred to as its outlet surface 1B, that is facing towards the eye 3 of a user for viewing as a virtual image. The pipe includes a diffractive component formed directly in the inlet surface 1A, this diffractive component being an element that satisfies the equation for an aspherical component of revolution as shown in FIG. 2.

This asphero-diffractive surface of "kinoform" type has the function of minimizing astigmatism and field curvature, and also of minimizing chromatic aberration.

Nevertheless, the use of a kinoform in the inlet surface suffers from the drawback of generating parasitic images.

The visibility of the parasitic images is associated with the quantity of light diffracted in diffraction orders other than the design order (commonly order 1). More specifically, these parasitic images appear as repetitions of the main image, each diffraction order giving rise to its own parasitic image. Since the power of the diffractive component is relatively weak, and given the configuration of the optical system, these parasitic images appear practically in focus for the user and slightly offset relative to the main image, and that is very troublesome.

Since the visibility of the parasitic images is associated with the quantity of light that is diffracted in the various diffraction orders of the kinoform engraved in the surface carrier, and since diffraction theory indicates that the fraction of light diffracted in order 1 relative to the quantity of incident light, i.e. the diffractive efficiency in order 1, is never equal to 100%, any diffractive pipe system as described in patent document FR 2 868 551 presents parasitic images due to diffraction in the higher orders of the surface kinoform.

That in itself is not necessarily a problem for the user, since everything depends on the brightness thresholds at which these parasitic images are located relative to the main image. It is thus possible to define ratios between the intensities of the various diffraction orders and the design order (generally order 1).

For a point source, these ratios may be defined as being the ratio $R_k$ between the peak value of the intensity of the point image at the diffraction order k under consideration, and the peak value of the intensity of the point image of the design diffraction order (generally order 1).

Optical theory concerning image formation and known to the person skilled in the art shows that the distribution of illumination in the image plane can be written in the scalar approximation as the convolution of a weighted Dirac comb function of the efficiencies of the diffraction orders by the value of the light intensity of the system at the aperture under consideration:

$$I(r) = \left[\sum_{k=\infty}^{k=+\infty} \delta(r + k \cdot r_0) \cdot \eta_k\right] * [PSF(r)]$$

where:

PSF(r) represents the value of the light intensity in the image plane as a function of position r in said plane;

$r_0$ is a given vector in the image plane with coordinates that can be calculated from the shape of the grating or the kinoform; and $\eta_k$ represents the diffraction efficiency for order k, i.e. the ratio between the quantity of light energy directed into order k by the grating or the kinoform divided by the total quantity of light energy incident on the grating.

Furthermore, it can be considered that the scalar approximation is valid.

Optical theory on image formation using the scalar approximation then specifies that these ratios determine the brightness ratios between the parasitic images and the main image.

This gives:

$$R_k = \eta_k / \eta_{kd}$$

In practice, it can be determined that the critical threshold for visibility of a parasitic image such as that coming from a higher diffraction order is about 1/20. Ideally, it should be less than this value, and it is found that below a ratio of about 1/50, parasitic images are hardly visible to the eye and constitute negligible discomfort at the image illumination values used, i.e. values of not less than 50 candelas per square meter ($Cd/m^2$), and typically lying in the range 100 $Cd/m^2$ to 200 $Cd/m^2$.

When a theoretical calculation is performed for the coefficients $R_k$ using optical diffraction theory as known to the person skilled in the art, and design data for the aspherodiffractive component, it is found that these coefficients are smaller than those values in the most unfavorable cases, i.e. with a pipe of the kind specified above, when there is a point image at the edge of the field.

Figure 3:
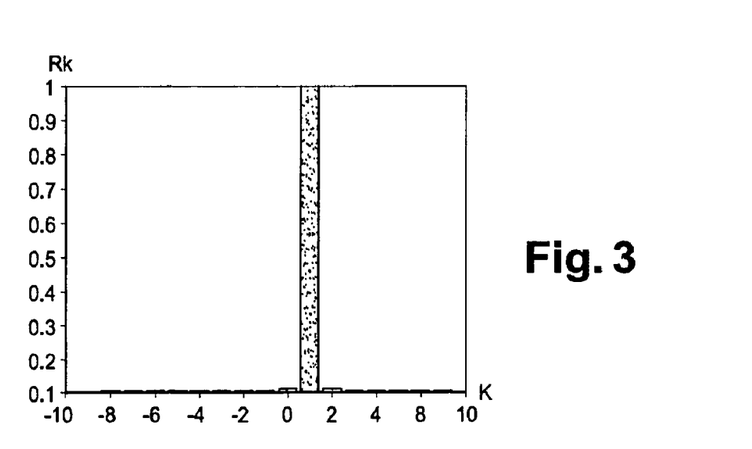
FIG. 3 is a histogram showing the brightness ratio between parasitic images and the main image $R_k$ as a function of the diffraction order k of the parasitic images in such a light pipe of the prior art and exempt from fabrication defects on its diffractive surface.

These values for the coefficients $R_k$ are shown in FIG. 3 and specified in the table below which gives the brightness ratios between the main image, i.e. order 1, and the higher diffraction orders for a diffractive pipe as specified, assuming that the inlet surface of ideal design is free from any fabrication defects.

| Diffraction order k | $R_k$ | $1/R_k$: intensity ratio |
| --- | --- | --- |
| −8 | 6.3975e−004 | 1563 |
| −7 | 4.7951e−004 | 2086 |
| −6 | 3.4965e−004 | 2860 |
| −5 | 2.9380e−004 | 3404 |
| −4 | 3.2059e−004 | 3119 |
| −3 | 4.4710e−004 | 2237 |
| −2 | 7.6548e−004 | 1306 |
| −1 | 1.7137e−003 | 584 |
| 0 | 7.0260e−003 | 142 |
| 1 | 1 | 1 |
| 2 | 8.0882e−003 | 124 |
| 3 | 2.1894e−003 | 457 |

-continued

| Diffraction order k | $R_k$ | $1/R_k$: intensity ratio |
|---|---|---|
| 4 | 1.4509e−003 | 689 |
| 5 | 1.5661e−003 | 639 |
| 6 | 1.9870e−003 | 503 |
| 7 | 2.3502e−003 | 425 |
| 8 | 2.1692e−003 | 461 |

It can therefore be deduced that the problem of parasitic images is in fact a problem of fabricating the diffractive surface. It should be observed that if the diffractive pipe is a part made by injection-molding, then the engraved surface is an imprint situated in the mold that transfers its shape to the pipe.

Such fabrication defects are inherent to the technology used for engraving the diffractive surface in the mold imprint. Examining the profile as engraved in comparison with the theoretical profile as calculated theoretically serves to reveal the defect.

Furthermore, when injection conditions are good, measurements comparing the molded diffractive surface on the injected part and the diffractive imprint in the mold show a direct correlation between each other which means that the shape has been transferred well. In other words the engraving defects in the imprint are transferred directly to the molded part.

Using the measured profile and making assumptions about the engraving method, it is possible to calculate the diffraction efficiency and the coefficients $R_k$ for the ratio between the intensity of the parasitic image of order k and the intensity of the main image. The person skilled in the art can perform this calculation using optical diffraction theory.

A common manner of quantifying the engraving defect is to refer to the "lost zone width" or LZW. This is the zone in which the engraved diffractive profile does not correspond to the theoretical profile. Typically, with present-day engraving technologies, this zone is of small size compared with the width of the total zone. It can be estimated as lying in the range 2 micrometers (μm) to 7 μm. The greater this width LZW, the greater the amount of energy that is dissipated in the higher orders.

A quick calculation demonstrates that the ratio of diffraction efficiency in order 1 (here the design order) between an ideal component and a component with LZW is given by:

$$R=((L-LZW)/L)^2$$

where L is the width of the diffraction zone and LZW is the width of the lost zone.

This simple calculation gives an order of magnitude for the energy that is dissipated in the higher orders and in order zero (i.e. all of the energy that is not channeled into order 1), however it is not sufficiently accurate to describe the visibility of the parasitic images compared with the main image. This is described by knowing all of the coefficients $R_k$, which requires full calculation of the diffraction figure of the real engraved profile. Nevertheless, it serves to give a first manner of specifying simply the properties of the diffractive component that is to be engraved.

Nevertheless, that method lacks accuracy and the invention proposes an optimized method that is more accurate, taking full account in its calculation of the diffraction pattern of the profile as engraved in order to specify the diffractive component.

This method in accordance with the invention makes it possible to specify the power of the diffractive portion engraved in the surface that gives optimum general performance for the pipe while minimizing the visibility of parasitic images.

To do this, the invention provides a light pipe for transmitting light signals from one of its ends, referred to as its inlet surface, to its other end, referred to as its outlet surface, facing towards the eye of a user for viewing a virtual image, the light pipe including a diffractive component formed directly in the inlet surface, the diffractive component being an element satisfying the equation of an aspherical component of revolution of the "kinoform" type, the pipe being characterized in that the diffractive component has power situated in a range D(Thresh,X) defined by:

$$D(Thresh,X)=D_{OPTDIF}(Thresh) \text{INTERSECTION } D_{XT}(X)$$

where the range $D_{TXT}(X)$ corresponds to the range of diffractive power values of said component for which the value of the overall transverse chromatic aberration is below an acceptable transverse chromatic aberration threshold X; and where $D_{OPTDIF}(Thresh)$ is a power range determined as a function of a diffraction efficiency, written "Thresh", that corresponds to an acceptable value for $1/R_k$, for given fabrication tooling, $R_k$ being the ratio between the peak value of the intensity of the point image of the diffraction order k under consideration, and the peak value of the intensity of the point image of the design diffraction order.

Preferably, the said acceptable transverse chromatic aberration threshold X is equal to or less than 6 minutes of arc (arcmin), transverse chromatic aberration being expressed in the form of an angle.

In a preferred embodiment, the range $D_{OPTDIF}(Thresh)$ is defined by:

$$D_{OPTDIF}(Thresh)=D_{OPTDIF}(Thresh,min\_height) \text{INTERSECTION } D_{OPTDIF}(Thresh,max\_height)$$

where min_height and max_height are maximum and minimum values for the step height h of said diffractive component.

In practice, said minimum and maximum heights correspond to manufacturing tolerance on the step height of said diffractive component.

Advantageously, $$D_{OPTDIF}(Thresh,h)=\text{INTERSECTION}_{k=-\infty \text{ to } +\infty}[D_k(Thresh,h)]$$

where $D_k(Thresh,h)$ is the power range for which the value of $1/R_k$ is greater than the value Thresh.

Advantageously, $D_k(Thresh,h)$ is defined by means of a representation of the variation in the ratios $1/R_k$ as a function of the diffractive power of the diffractive component, the engraving defect being known and considered as being constant, by using a simulation taking account of parameters for the diffractive profile and at least specifically the step height, the inclination of the light rays relative to the surface carrying said diffractive component, the light spectrum used, the spectral sensitivity function of the eye, the spectral transmission of the optical system upstream from said surface, and the position of the image point.

Preferably, said position of the image point is selected so as to minimize the ratios $1/R_k$.

Also preferably, said position of the image point is situated at the edge of the field.

The value of k may lie in the range −8 to +8.

The value of Thresh may be greater than or equal to 30.

The invention is described below with reference to figures that merely show an embodiment of the invention.

Figure 4:
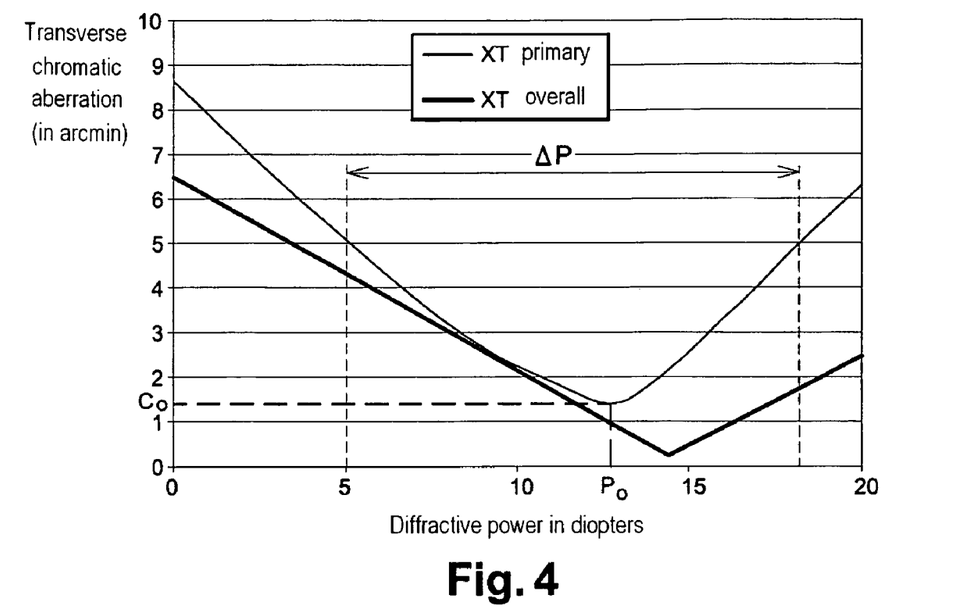
FIG. 4 is a graph showing the variation in transverse chromatic aberration for an edge-of-field image point as a function of the diffractive engraved power in the inlet face.

From the point of view of optical quality, the diffractive power provided by engraving a kinoform in the inlet surface of the pipe serves to compensate to a greater or lesser extent for the transverse chromatic aberration of the optical combination of the pipe. FIG. 4 is a graph showing the variation in edge-of-field transverse chromatic aberration as a function of the diffractive power engraved or molded in the inlet face.

The primary transverse chromatic aberration is calculated as the distance between the impacts of the main rays in the blue and red wavelengths of the visible spectrum, while overall chromatic aberration is calculated as being the longest segment between the impacts of the main rays of two arbitrary and different wavelengths of the spectrum under consideration in the calculation. With achromatic optics, because of image spot folding phenomena, it is appropriate to take into consideration only overall transverse chromatic aberration.

Alternatively, at the impact of the main ray for a wavelength, when calculating transverse chromatic aberration, it is possible to take into consideration the centroid of the spreading function of the point at the wavelength under consideration, or the center of the disk that contains a certain percentage of the energy within the circle (preferably at least 50%).

Since the pipe is for use in applications for viewing a virtual image, transverse chromatic aberration is expressed in the form of the angle at which the above-specified segment is perceived.

Using the graph of FIG. 4, it can be seen that there exists an optical performance optimum for the pipe when the diffractive optical power of value $P_0$ is equal to about 13 diopters (D), for residual overall transverse chromatic aberration of value $C_0$ equal to about 1.4 arcmin. There is a range of powers $\Delta P$ for the kinoform engraved in the inlet surface within which the overall transverse chromatic aberration is kept within thresholds that are acceptable for the human eye.

The notation $P_{OPTXT}$ designates the value of the diffractive power engraved in the inlet face such that the residual transverse chromatic aberration is minimized. In the example shown, we have $P_{OPTXT}$=13.00 D.

It is assumed that the transverse chromatic aberration acceptability threshold for the eye is 5 arcmin at most. Above that, chromatic aberration degrades the image too strongly for it to present satisfactory quality. It is thus possible to define an optimum diffractive power zone for chromatic aberration (ZPDOC) that is obtained by tracing the curve showing variation in overall transverse chromatic aberration (XTG) as a function of the diffractive power (PD) of the inlet surface: XTG=f(PD), and by finding the set of abscissa points PD for said curve that lie below the curve XTG=5 arcmin.

In the example shown, and as can be seen in FIG. 4, this gives a diffractive power zone $\Delta P$ lying in the range about 4.95 D to 18.40 D.

It is thus possible to define an optical power domain allocated to the inlet face such that the residual overall transverse chromatic aberration is less than a certain value X in arcmin. This is written $D_{XT}(X)$.

We thus have:

$$D_{XT}(5)=[4.95D; 18.40D]$$

In practice, it is preferable to select chromatic aberration values of less than 5 arcmin.

It is explained above that engraving defects due to using a lathe of nanometer precision and due to the diamond tool used for making the diffractive surface or its imprint in the mold are the cause of the abnormally high visibility of images of parasitic diffraction orders.

Figure 5:
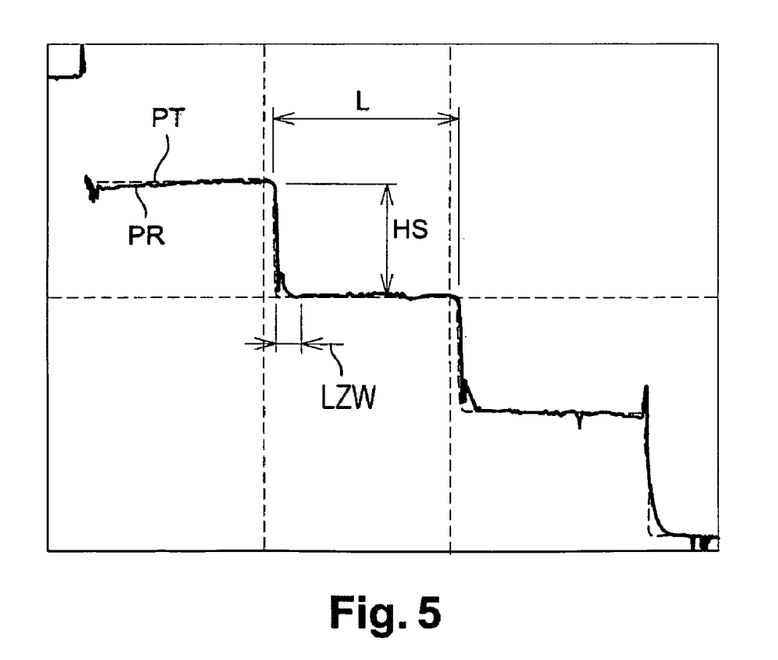
FIG. 5 compares a theoretical profile and a real profile of a diffractive component engraved in the inlet face of the light pipe.

As shown in FIG. 5, which shows both the real profile PR and the theoretical profile PT, it is possible by observing said surface to quantify the defects accurately on the engraved profile. Such defects are often to be found in the vicinity of the step between one zone and the neighboring zone. It is also known that the phenomena that give rise to these defects are of mechanical origin: they are caused by the fact that the mechanism of the lathe and the radius of the tool constituting by the diamond tip, given that it is not a true point, cannot generate exactly the discontinuity in the theoretical curve for the profile as constituted by the step between one zone and the adjacent zone.

In theory as in practice, the defects that are generated depend solely on the profile of the step or its height HS, on the diamond tool, and on the precision lathe used for engraving, taking the mechanical adjustment of the lathe into consideration; the defects do not depend on the width of the diffractive zone L. Measurements have verified this theoretical observation on a variety of diffractive profiles presenting a variety of zone widths in the range several hundred to a few micrometers.

It is therefore possible, finally, to conclude that since the defects that are generated are constant and depend only on the tooling and the height of the step, if the defects are known accurately, it is possible to control the quantity of light that is present in the parasitic orders by selecting an appropriate diffractive power for the inlet surface.

In the diffractive pipe under consideration, the kinoform engraved in the inlet surface presents a phase function with symmetry of revolution. The minimum width of the diffractive zones over the component as a whole is therefore known once the diameter of the engraving on the component is determined. For example, for a quadratic profile of coefficient A having its surface equation written in the following form:

$$Z=(A \cdot y^2) \bmod h$$

where Z is the local deflection at the abscissa point y, and h is the height of the diffractive step; the width of the $k^{th}$ engraved zone is given by the following equation:

$$L_k = [(k+1) \cdot h/A]^{1/2} - [k \cdot h/A]^{1/2}$$

In general, it can be considered that it is possible using analytical or numerical methods to determine the widths of the zones at any location on the diffractive surface.

In the above equation, the quadratic equation A is expressed as a function of the optical power of the engraved diffractive component as follows:

$$A = P/[2 \cdot (n-1)]$$

where n is the refractive index of the material in which the kinoform is made.

Zone width can thus be expressed for any point on the surface as a function of optical power as follows:

$$L_k = [(k+1) \cdot h/[P/[2 \cdot (n-1)]]]^{1/2} - [k \cdot h/[P/[2 \cdot (n-1)]]]^{1/2}$$

The above example can be generalized analytically or else it can be computed numerically for all circumstances, providing the profile to be engraved is known.

It is then possible, given knowledge of the "lost zone width" or LZW that is constant over the profile as a whole, to evaluate quickly the diffractive efficiency in design order 1:

$$R = [(L_k - LZW)/L_k]^2$$

By locally substituting the equation given the widths of the zones into the above equation, it can thus be shown that the loss of efficiency (1−R) in order 1 depends in the end only on the power of the component, on the height of the step, and on the distance to the center taken into consideration on the basis of the value of the diffractive zone number k.

In the end, it is thus possible, once the value of LZW has been measured and is known, to express not only the loss of efficiency in design order 1 directly as a function of power, but above all to express accurately the values of the coefficients $R_k$, i.e. the brightness ratios between the parasitic orders and the design order (order 1), directly as a function of the power of the diffractive component.

For example, with the above pipe, it is assumed that the diffractive power is about 13 diopters, i.e. close to the optimum concerning correction of transverse chromatic aberration, and it is assumed that the profile as shown in FIG. 5 has been measured and found to have a lost zone width LZW of 3 μm, the profile data making it possible by simulation to calculate in advance the values for the coefficients $R_k$ for each diffraction order.

Figure 6:
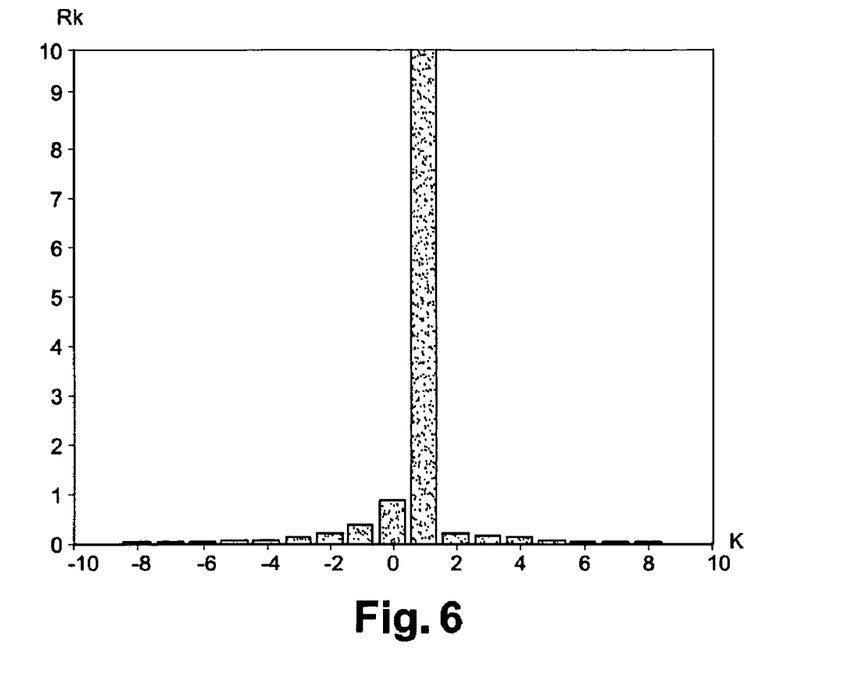
FIG. 6 is a histogram showing the brightness ratio between parasitic images and the main image $R_k$ as a function of the diffraction order k of the parasitic images, in such a light pipe of the prior art and presenting a fabrication defect of the kind shown in FIG. 5, in a simulation in accordance with the invention.

The results of these simulations are given in the fowling table, and plotted in the histogram of FIG. 6.

| Diffraction order k | $R_k$ | $1/R_k$: intensity ratio |
|---|---|---|
| −8 | 2.2873e−003 | 437.2 |
| −7 | 1.2970e−003 | 771.0 |
| −6 | 1.7524e−003 | 570.6 |
| −5 | 3.2093e−003 | 311.6 |
| −4 | 5.7437e−003 | 174.1 |
| −3 | 1.0948e−002 | 91.34 |
| −2 | 2.0415e−002 | 48.98 |
| −1 | 3.6426e−002 | 27.45 |
| 0 | 8.7084e−002 | 11.48 |
| 1 | 1.0000 | 1 |
| 2 | 1.9780e−002 | 50.56 |
| 3 | 1.4383e−002 | 69.53 |
| 4 | 8.9430e−003 | 111.82 |
| 5 | 3.1287e−003 | 319.62 |
| 6 | 6.8608e−004 | 1457.6 |
| 7 | 1.7124e−003 | 583.96 |
| 8 | 2.0106e−003 | 497.36 |

The above simulation is more complex than calculating the preceding equations which do no more than give the overall loss of diffraction efficiency of order 1, whereas the simulation gives detail for all of the coefficients $R_k$. It takes account of the parameters of the diffractive profile as measured (see FIG. 5), the configuration of the light rays (see FIG. 1), the light spectrum used, the spectrum sensitivity function of the receiver (here the eye under daylight conditions: in other words the CIE function Y2° (λ), cf. CIE publication 15:2004 ISBN 3901906339).

Figure 7:
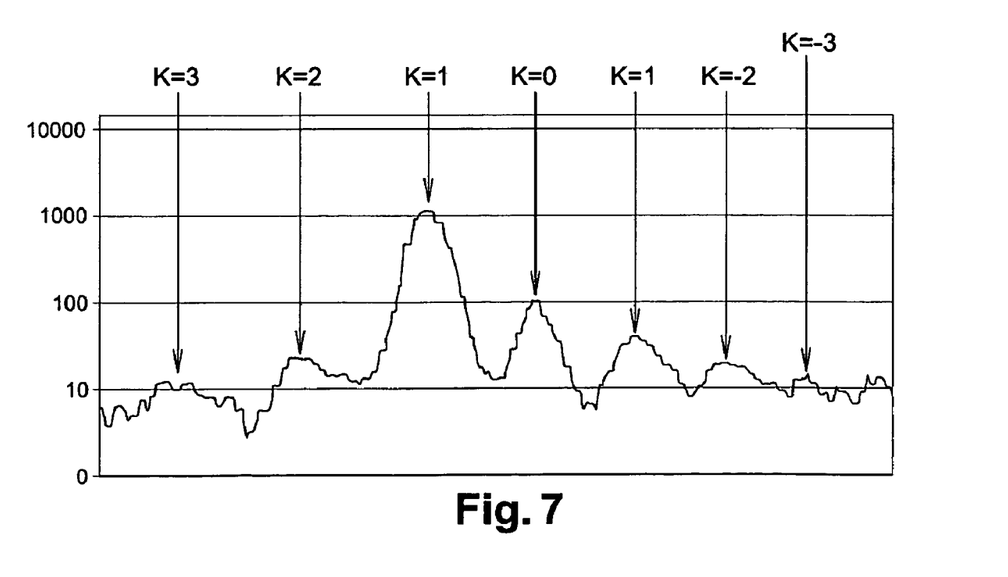
FIG. 7 is a graph that results from measuring the brightness of parasitic images due to higher diffraction orders for an edge-of-field image point using an imaging photo-colorimeter.

In order to validate this method, as can be seen in the graph of FIG. 7, the brightnesses of the parasitic images due to the higher diffraction orders has been measured directly for an edge-of-field image point by using an imaging photo-colorimeter. Good correlation was found between the measurements and the theoretical predictions.

Numerically, the measurement results are summarized as in the table below and they demonstrate this good correlation:

| | Order | | | | | | |
|---|---|---|---|---|---|---|---|
| | 3 | 2 | 1 | 0 | −1 | −2 | −3 |
| Peak measured brightness (Cd/m²) | 16 | 30 | 1444 | 130 | 44 | 25 | 18 |
| Measured ratio $1/R_K$ | 90.25 | 48.13 | 1 | 11.113 | 32.82 | 57.76 | 80.22 |
| Simulated ratio $1/R_K$ | 69.52 | 50.58 | 1 | 11.48 | 27.45 | 48.98 | 91.34 |

It is then possible to plot a graph for the pipe in question that shows the variation in the ratios $1/R_k$ as a function of the diffractive power engraved in the inlet face, the engraving defects being known and considered to be constant.

Figure 8:
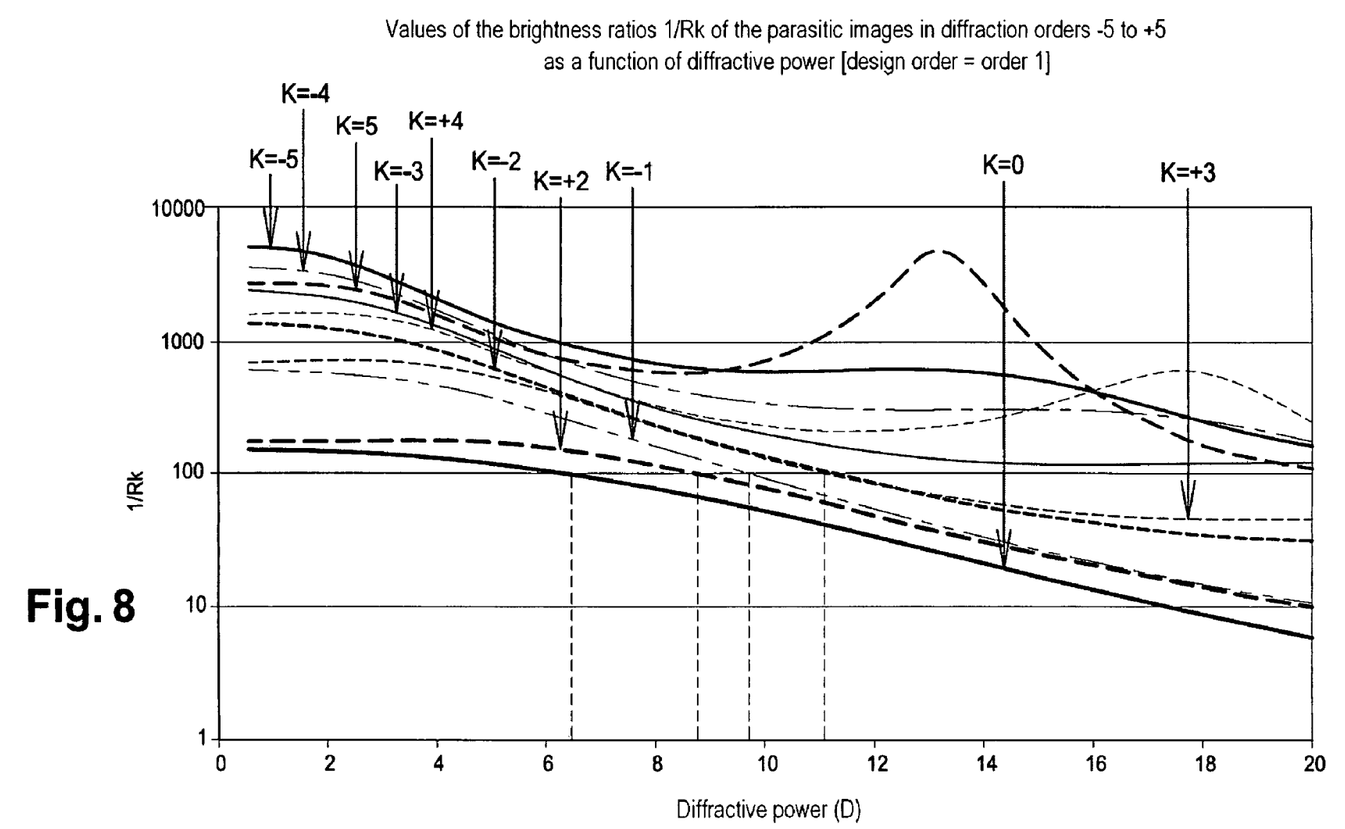
FIG. 8 is a graph showing the value of the brightness ratios $1/R_k$ of parasitic images of diffraction orders −5 to +5 as a function of diffractive power (design order=order 1) for a component having a step height of 1100 nanometers (nm).

The graph shown in FIG. 8 is plotted from a simulation that takes account of the parameters of the diffractive profile as measured (see FIG. 5), and at least specifically: the step height; the inclination of the light rays relative to the inlet surface (determined by ray tracing, see FIG. 1); the light spectrum used; the spectral sensitivity function of the receiver (that of the eye under daylight conditions: which here means the CIE Y2° (λ) function); and the spectrum transmission of the optical system upstream from the inlet surface.

From this graph, it can be seen that it is possible to determine diffractive power zones on the inlet surface where the coefficient $1/R_k$ is greater than a given value Y, i.e. in which the ratio between the brightnesses of the main image and of the parasitic image of the order k under coordination is greater than Y. These are written $D_k(Y,h)$.

For example, in FIG. 8, for Y=100 and h=1100 nm, the following diffractive powers are obtained in the range under consideration from 0 to 20.00 D:

$D_0(100, 1100)=[0; 6.37]$
$D_2(100, 1100)=[0; 8.76]$
$D_{-1}(100, 1100)=[0; 9.65]$
$D_3(100, 1100)=[0; 11.07]$

For all other orders, the value of $1/R_k$ is always greater than Y=100.

The domain for optimizing the diffraction of higher orders for a given threshold and a given step height is then defined as being the intersection between sets $D_k(Y,h)$.

This is written:

$$D_{OPTDIF}(Y,h) = \text{INTERSECTION}_{k=-\infty \text{ to } +\infty}[D_k(Y,h)]$$

In this example:

$$D_{OPTDIF}(100,1100) = [0; 6.37]$$

In practice, it is possible to limit k to diffraction orders of −8 to +8, or even −5 to +5.

Figure 9:
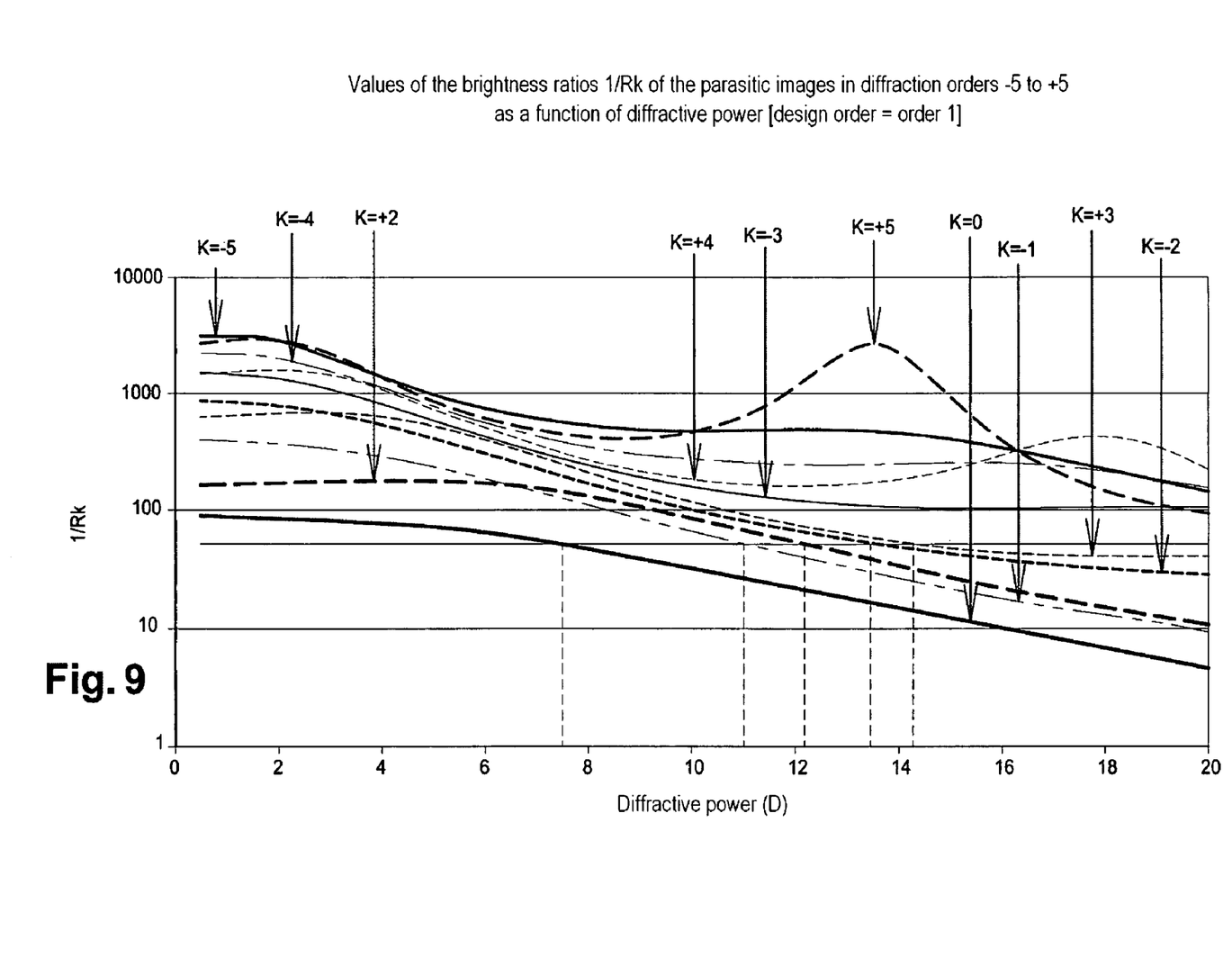
FIG. 9 is a graph showing the value of the brightness ratios $1/R_k$ of parasitic images of diffraction orders −5 to +5 as a function of diffractive power (design order=order 1) for a component having a step height of 1050 nm.

A ratio threshold of Y=100 is indicative and is given here by way of example. In practice, it is also appropriate to take account of the tolerances in the system and of uncertainties in measurements, in particular concerning step height which is very critical for the ratio values obtained. FIG. 9 shows this in particular.

There can be seen a very great difference between the thresholds of FIG. 8 and those of FIG. 9 even though the step height difference is only 50 nm.

Thus, for a threshold of 50 the following is obtained:

$D_0(50, 1050) = [0; 7.50]$
$D_2(50, 1050) = [0; 12.20]$
$D_{-1}(50, 1050) = [0; 11.11]$
$D_{-2}(50, 1050) = [0; 13.60]$
$D_3(50, 1050) = [0; 14.46]$

Here:

$$D_{OPTDIF}(50,1050) = [0; 7.50]$$

It should be observed that in this example, as is usually the case, there exists a parasitic diffraction order that is always brighter than the others. It is thus that particular order that defines the most restrictive range. Here it is order 0.

It is therefore important to estimate uncertainty concerning measurement of step height and to take account thereof when performing simulations. This is the most sensitive parameter. It is appropriate to perform two extreme simulations corresponding to the extreme values of the range in measurement uncertainty concerning step height.

The final range for optimizing diffraction of higher orders is defined as the intersection of two ranges for which the value of the ratio corresponds to the desired threshold and for which the values of the step heights correspond to the extremes in the measurement uncertainty concerning step height.

This can be written:

$$D_{OPTDIF}(\text{Thresh}) = D_{OPTDIF}(\text{Thresh,min\_height}) \text{INTERSECTION } D_{OPTDIF}(\text{Thresh,max\_height})$$

For an ocular system as specified above, experience shows that a minimum threshold of 30 is acceptable to a wearer, and that above a threshold that is equal to 50, there is practically no discomfort.

In order to optimize the component in full, a diffractive component is determined that has diffractive power on its inlet face that lies within a range defined as being:

$$D(\text{Thresh},X) = D_{OPTDIF}(\text{Thresh}) \text{INTERSECTION } D_{XT}(X)$$

where X corresponds to the acceptable transverse chromatic aberration threshold, and preferably, for the above application, Thresh=50 and X=4 arcmin, although it is possible to accept Thresh=30 and X=6 arcmin; and where the ranges are calculated as explained both for transverse chromatic aberration and for diffraction efficiency.

The values specified in this description are specific to an optical combination as described in the beginning of the description, however the method can be applied to other designs, for example to an ophthalmic lens.

Furthermore, the term "eye" should be understood as covering any receiver suitable for receiving a virtual image.

The invention claimed is:

1. A light pipe for transmitting light signals from one of its ends, referred to as its inlet surface, to its other end, referred to as its outlet surface, facing towards the eye of a user for viewing a virtual image, the light pipe comprising:
   a diffractive component formed directly in the inlet surface, the diffractive component being an element satisfying the equation of an aspherical component of revolution of the "kinoform" type, wherein the diffractive component of the pipe has power situated in a range $D(\text{Thresh},X)$ defined by:

$$D(\text{Thresh},X) = D_{OPTDIF}(\text{Thresh}) \text{INTERSECTION } D_{XT}(X)$$

where the range $D_{TXT}(X)$ corresponds to the range ($\Delta P$) of diffractive power values of said component for which the value of the overall transverse chromatic aberration is below an acceptable transverse chromatic aberration threshold X equal to or less than 6 arcmin, transverse chromatic aberration being expressed in the form of an angle; and where $D_{OPTDIF}$(Thresh) is a power range determined as a function of a diffraction efficiency, written "Thresh", that corresponds to an acceptable value for $1/R_k$, for given fabrication tooling, $R_k$ being the ratio between the peak value of the intensity of the point image of the diffraction order k under consideration, and the peak value of the intensity of the point image of the design diffraction order.

2. A pipe according to claim 1, wherein the range $D_{OPTDIF}$(Thresh) is defined by:

$$D_{OPTDIF}(\text{Thresh}) = D_{OPTDIF}(\text{Thresh,min\_height}) \text{INTERSECTION } D_{OPTDIF}(\text{Thresh,max\_height})$$

where min_height and max_height are maximum and minimum values for the step height h of said diffractive component.

3. A pipe according to claim 2, wherein $$D_{OPTDIF}(\text{Thresh},h) = \text{INTERSECTION}_{k=-\infty \text{ to } +\infty}[D_k(\text{Thresh},h)]$$

where $D_k(\text{Thresh},h)$ is the power range for which the value of $1/R_k$ is greater than the value Thresh.

4. A pipe according to claim 3, wherein $D_k(\text{Thresh},h)$ is defined by means of a representation of the variation in the ratios $1/R_k$ as a function of the diffractive power of the diffractive component, the engraving defect being known and considered as being constant, by using a simulation taking account of parameters for the diffractive profile and at least specifically the step height, the inclination of the light rays relative to the surface carrying said diffractive component, the light spectrum used, the spectral sensitivity function of the eye, the spectral transmission of the optical system upstream from said surface, and the position of the image point.

5. A pipe according to claim 4, wherein said position of the image point is selected so as to minimize the ratios $1/R_k$.

6. A pipe according to claim 5, wherein said position of the image point is situated at the edge of the field.

7. A pipe according to claim 1, wherein the value of k lies in the range −8 to +8.

8. A pipe according to claim 1, wherein the value of Thresh is greater to or equal to 30.

* * * * *